United States Patent [19]

Fishbine et al.

[11] Patent Number: 4,933,976
[45] Date of Patent: Jun. 12, 1990

[54] SYSTEM FOR GENERATING ROLLED FINGERPRINT IMAGES

[75] Inventors: Brian H. Fishbine, Albuquerque, N. Mex.; Glenn M. Fishbine, Eden Prairie, Minn.; Theodore D. Klein, Mound, Minn.; Daniel E. Germann, Minneapolis, Minn.

[73] Assignee: C.F.A. Technologies, Inc., Eden Prairie, Minn.

[21] Appl. No.: 148,066

[22] Filed: Jan. 25, 1988

[51] Int. Cl.$^5$ .............................................. G06K 9/00
[52] U.S. Cl. .......................................... 382/4; 382/5
[58] Field of Search .............................. 382/4, 2, 5, 42

[56] References Cited

U.S. PATENT DOCUMENTS

| | | | |
|---|---|---|---|
| 3,200,701 | 8/1965 | White | 88/14 |
| 3,407,715 | 10/1968 | McCutchen | 95/1.1 |
| 3,478,658 | 11/1969 | Hu et al. | 95/1.1 |
| 3,482,498 | 12/1969 | Becker | 95/12 |
| 3,581,282 | 5/1971 | Altman | 340/149 |
| 3,614,737 | 10/1971 | Sadowsky | 340/146 |
| 3,639,905 | 2/1972 | Yaida et al. | 340/149 |
| 3,648,240 | 3/1972 | Jacoby et al. | 340/146 |
| 3,743,772 | 7/1973 | Pieters et al. | 178/7.2 |
| 3,850,510 | 11/1974 | Baker | 350/286 |
| 3,906,520 | 9/1975 | Phillips | 354/62 |
| 3,944,978 | 3/1976 | Jensen et al. | 340/146.3 |
| 3,968,476 | 7/1976 | McMahon | 340/146.3 |
| 3,975,711 | 8/1976 | McMahon | 340/146.3 |
| 4,047,152 | 9/1977 | Giuliano et al. | 340/146.3 |
| 4,074,231 | 2/1978 | Yajima et al. | 340/146.3 |
| 4,107,885 | 8/1978 | Ott | 364/413 |
| 4,120,585 | 10/1978 | DePalma et al. | 356/71 |
| 4,151,512 | 4/1979 | Riganati et al. | 340/146.3 |
| 4,186,378 | 1/1980 | Moulton | 340/146.3 |
| 4,205,341 | 5/1980 | Mitsuya et al. | 358/135 |
| 4,206,441 | 6/1980 | Kondo | 340/146.3 |
| 4,227,805 | 10/1980 | Schiller | 356/71 |
| 4,236,082 | 11/1980 | Butler | 250/461 |
| 4,238,768 | 12/1980 | Mitsuya et al. | 358/135 |
| 4,246,568 | 1/1981 | Peterson | 340/146.3 |
| 4,322,163 | 3/1982 | Schiller | 356/71 |
| 4,340,300 | 7/1982 | Ruell | 356/71 |
| 4,357,597 | 11/1982 | Butler | 340/146.3 |
| 4,385,831 | 5/1983 | Ruell | 356/71 |
| 4,428,670 | 1/1984 | Ruell et al. | 356/71 |
| 4,429,413 | 1/1984 | Edwards | 382/4 |
| 4,455,083 | 6/1984 | Elmes | 356/71 |
| 4,544,267 | 10/1985 | Schiller | 356/71 |
| 4,553,165 | 11/1985 | Bayer | 358/167 |
| 4,553,837 | 11/1985 | Marcus | 356/71 |
| 4,568,178 | 2/1986 | Rios | 355/40 |
| 4,569,080 | 2/1986 | Schiller | 382/4 |
| 4,573,070 | 2/1986 | Cooper | 358/36 |
| 4,577,235 | 3/1986 | Kannapell et al. | 358/280 |
| 4,652,116 | 3/1987 | Rios | 355/40 |
| 4,668,995 | 5/1987 | Chen et al. | 358/282 |
| 4,681,435 | 7/1987 | Kubota et al. | 356/71 |
| 4,684,802 | 8/1987 | Hakenewerth et al. | 250/235 |

FOREIGN PATENT DOCUMENTS 3432886 1/1986 Fed. Rep. of Germany .
1279317 11/1961 France ............................. 350/286

Primary Examiner—Leo H. Boudreau
Assistant Examiner—Yon Jung
Attorney, Agent, or Firm—Kinney & Lange

[57] ABSTRACT

A method for generating data characteristic of a rolled fingerprint image in real time. A finger is continuously rolled across a finger receiving surface of an optical device. The finger receiving surface is imaged to generate digital data representative of fingerprint images propagated therefrom. A first array of data characteristic of a fingerprint image of a first finger slice is stored, and merged into a composite array. After the first array is merged into the composite array, a second array of data characteristic of a second finger slice which is adjacent to and overlaps the first finger slice is stored. The second array is then merged into the composite array by storing data in the composite array as a function of a comparison and an average of data in the composite array and second array which are characteristic of overlapping portions of the finger slices. The steps of storing and merging are then repeated for third and subsequent arrays characteristic of finger slices as the finger is rolled, until the composite array characterizes the rolled fingerprint image.

33 Claims, 7 Drawing Sheets $$VAR_{n,m} = \frac{\left[\sum_{k=m-P}^{m+P}(PV_{n,k})^2\right] - \left[\frac{\left(\sum_{k=m-P}^{m+P}PV_{n,k}\right)^2}{2P+1}\right]}{2P+1} \quad Eq. 1$$

SYSTEM FOR GENERATING ROLLED FINGERPRINT IMAGES

BACKGROUND OF THE INVENTION

1. Field of the Invention.

The present invention relates to computer processing of optical fingerprint images to produce rolled fingerprint images.

2. Description of the Prior Art.

Over the years, the most commonly used technique for obtaining "rolled" fingerprints has been to apply ink to the tip of individual fingers and roll the inked fingertips at an appropriate location on an applicant card. While these inking procedures will usually provide satisfactory images, they have their drawbacks. The inking procedure is messy. Several attempts are often required in order to obtain an acceptable fingerprint. Perhaps even a bigger drawback of this system is that the printed images are not easily adaptable to computerized storage and processing techniques, inhibiting cooperation and fingerprint data transfer between various police agencies.

Systems which optically or optically and mechanically generate fingerprint images are also in use. Several such fingerprinting systems are disclosed in the Becker U.S. Pat. No. 3,482,498, McMahon U.S. Pat. No. 3,975,711, Schiller U.S. Pat. Nos. 4,544,267 and 4,322,163, and Marcus U.S. Pat. No. 4,553,837. However, for a variety of reasons systems such as these have not gained widespread acceptance.

Due to the compound curved nature of the fingerprint on a finger, it is difficult to optically obtain an image of the fingerprint, especially an image corresponding to a rolled fingerprint. The Schiller patents disclose an apparatus in which a finger pressed against a platen provides a fingerprint object which is scanned by an interrogating beam of columnated light. The beam of light is linearly displaced across the platen thereby maintaining a constant angle between the interrogating light beam and the plane of the object being scanned. The Marcus U.S. Pat. No. 4,553,837 discloses a finger processing apparatus which includes a cylindrical-segment platen which supports a finger. Optical scanning equipment scans the circumference of the platen in such a manner that the angle of incidence of a light beam on the fingerprint object remains constant. The Becker U.S. Pat. No. 3,482,498 discloses several embodiments of an optical apparatus for producing a rolled fingerprint image. The embodiment shown in FIG. 1A utilizes a plurality of prisms and light sources, and produces only an approximation of the ball and side ridges. The embodiment shown in FIGS. 2 and 3 utilize a mechanical system actuated by a rolling finger to move and position a light source.

While the fingerprinting systems disclosed in the Marcus patent and the second embodiment disclosed in the Becker patent may be capable of optically providing a rolled fingerprint image, these sytems are less than wholly desirable. The mechanical aspects of these systems are relatively complicated. As a result, maintaining focus during the time required to obtain the entire rolled fingerprint image can be difficult. Although the fingerprint image produced by the first embodiment of the invention disclosed in the Becker patent provides an image in real-time, this image only approximates the rolled fingerprint image.

It is evident that there is a continuing need for improved optical fingerprinting systems. A system which can optically generate rolled fingerprint images in real time is desired. The system must of course be accurate and reliable.

SUMMARY OF THE INVENTION

The present invention is an improved method for generating data characteristic of a rolled fingerprint image. Arrays of slice data characteristic of adjacent and overlapping two-dimensional slices of the fingerprint image are generated. A composite array of data characteristic of the rolled fingerprint image is generated as a mathematical function of overlapping slice data from a plurality of the overlapping slices. In preferred embodiments, the composite array is generated as a mathematical function of a comparison and an average of the overlapping slice data characteristic of the overlapping portions of adjacent slices. The composite array generated in accordance with this method accurately characterizes transitions between the boundaries of adjacent image slices and results in fewer discontinuities and artifacts.

DETAILED DESCRIPTION OF THE PREFERRED EMBODIMENTS

Figure 1:
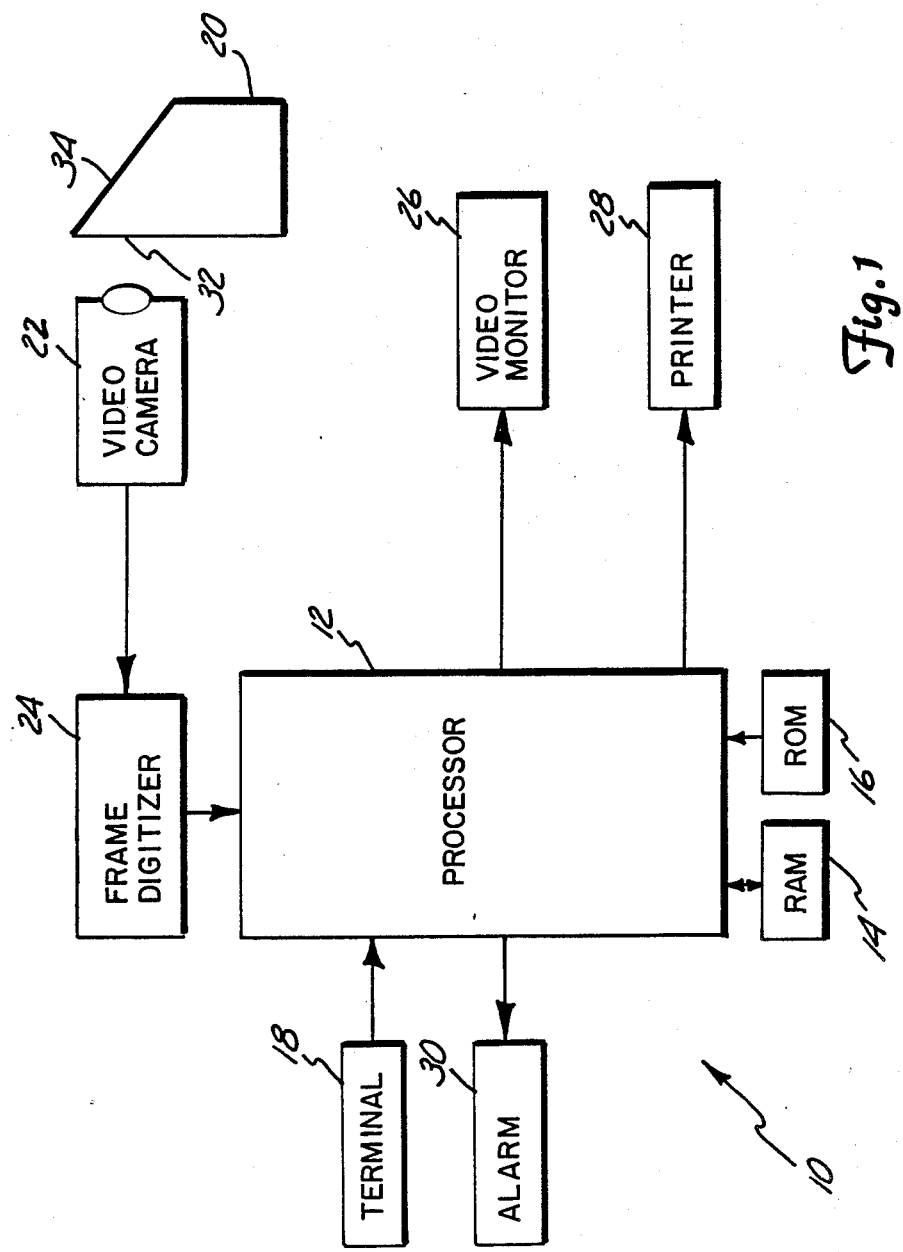
FIG. 1 is a block diagram representation of a system which can be used to generate rolled fingerprint images in accordance with the present invention.

A fingerprinting system 10 which can be used to optically produce rolled fingerprint images in accordance with the present invention is illustrated generally in FIG. 1. Fingerprinting system 10 is a microprocessor based system which includes processor 12 and associated random access memory (RAM) 14 and read only memory (ROM) 16. Video camera 22, frame digitizer 24, video monitor 26, printer 28, alarm 30 and terminal 18 are interfaced to processor 12. Fingerprint images from portions of a finger rolled across a finger prism 20 are imaged by camera 22 and digitized by digitizer 24. Arrays of digital data representative of the fingerprint images are provided to processor 12 and processed in real time in accordance with a software program stored in ROM 16 to produce a composite array of digital data characteristic of the rolled fingerprint image. Terminal 18 will include a keyboard (not separately shown) which is used by an operator to interface with fingerprinting system 10. Rolled fingerprint images generated by system 10 can be displayed on video monitor 26, or printed onto a standard applicant card by printer 28. Alarm 30 is activated when a fingerprint is not properly captured, providing the operator with an indication that the capture procedure must be repeated.

Optical devices such as finger prism 20 are well known and disclosed, for example, in the McMahon U.S. Pat. No. 3,975,711 and the White U.S. Pat. No. 3,200,701. Finger prisms of this type are also disclosed in copending applications Ser. Nos. 019,889, 020,326 and 020,331, entitled "Optical Devices for Providing Fingerprint Images", "Optical Fingerprinting System", and "Method For Producing Computer Enhanced Fingerprint Images", respectively, all of which are assigned to the same assignee as the present invention. These devices utilize the optical principle of total internal reflection. When a finger is positioned on finger receiving surface 34 (which is preferably a planar surface in the present invention), an optical image of the ridge and valley pattern on the surface of the finger (i.e. the fingerprint) is propagated from image propagation surface 32. Other means or optical devices which provide fingerprint images can also be used.

Figure 2A:
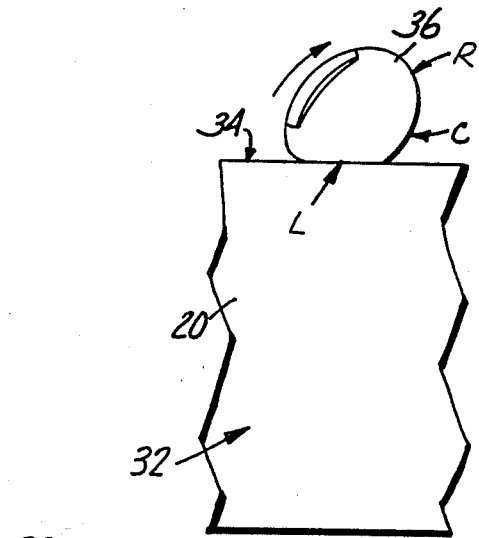
FIGS. 2A-2C show several portions of a finger in contact with the prism shown in FIG. 1, as the finger is rolled across the prism during a fingerprint capture operation.
Figure 3A:
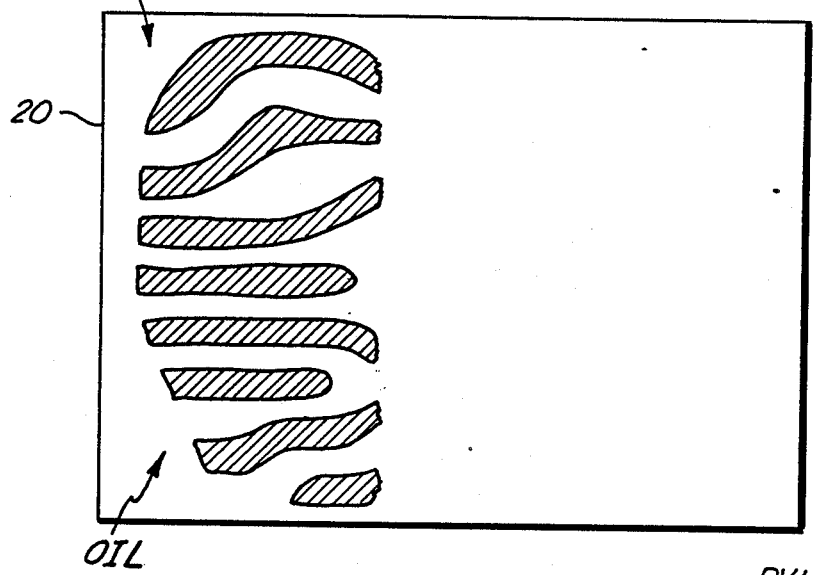
FIGS. 3A-3C illustrate an optical image of the fingerprint of the portions of the finger in contact with the prism in FIGS. 2A-2C, respectively.
Figure 2B:
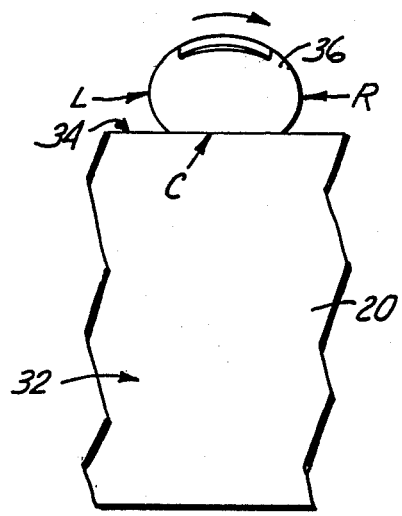
Figure 3B:
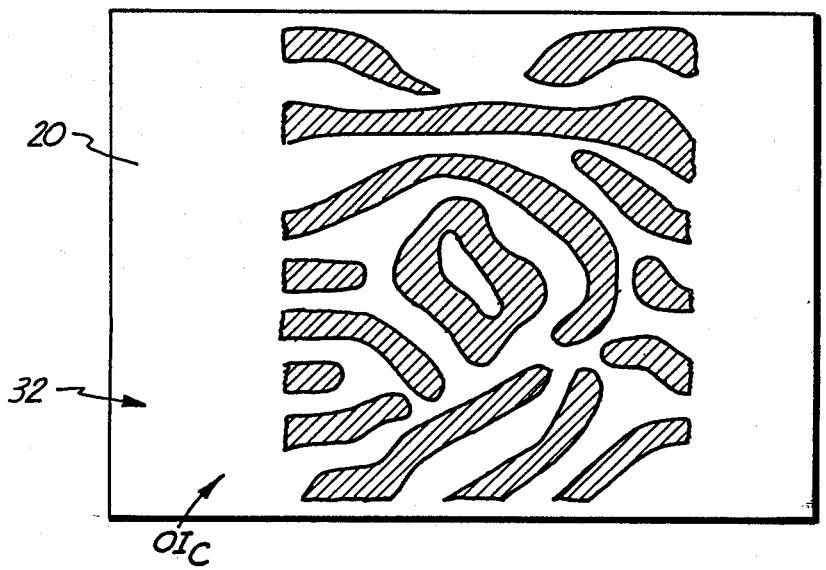
Figure 2C:
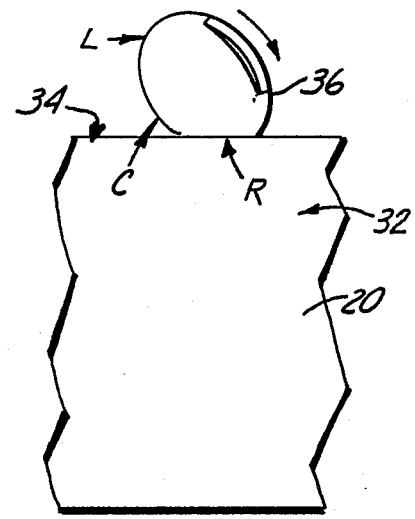
Figure 3C:
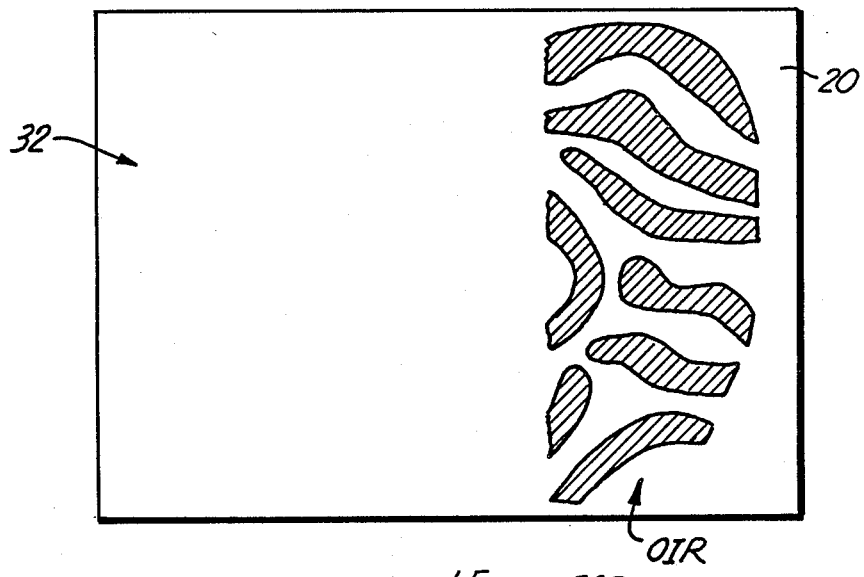
Figure 6:
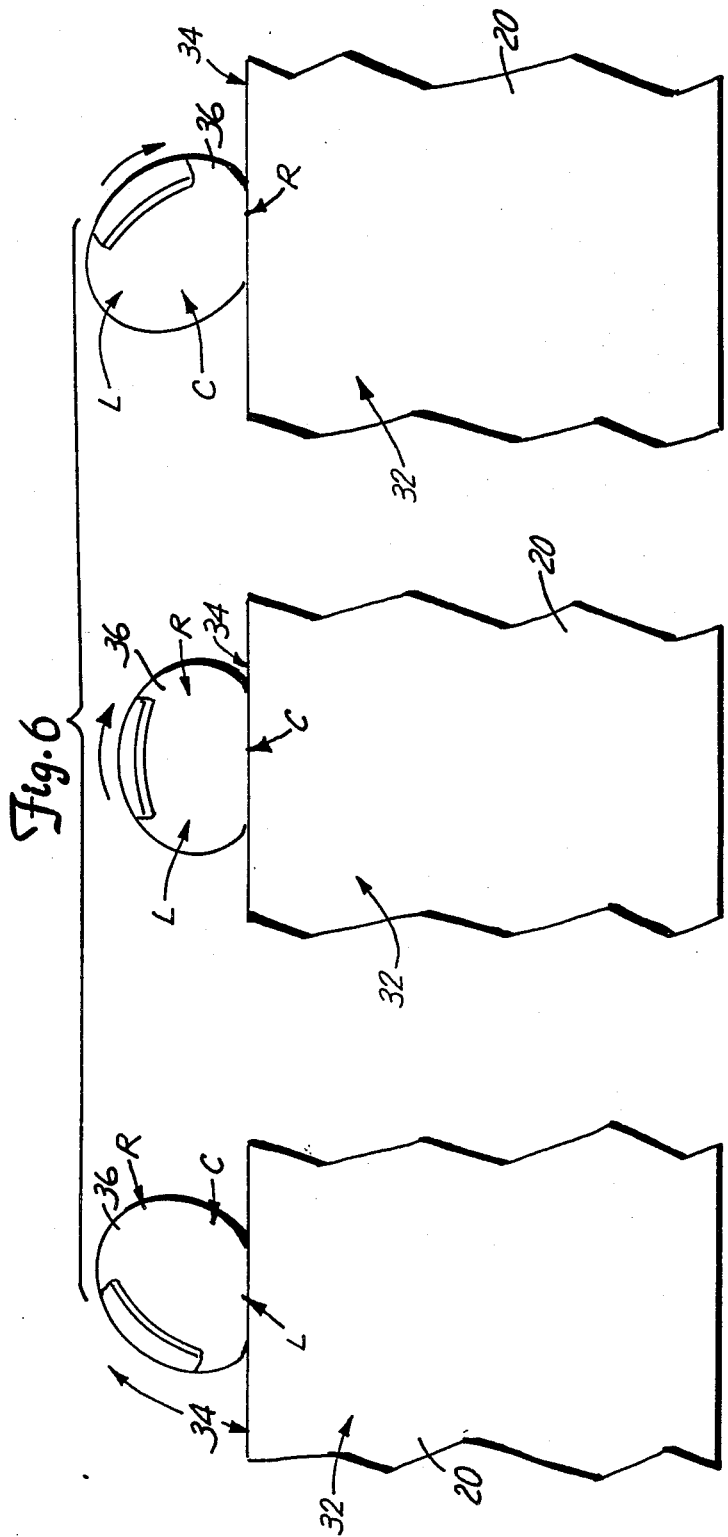
FIG. 6 is a sequence of illustrations showing the finger being rolled across the prism.

A person to be fingerprinted will position a first edge portion of their finger 36 on surface 34 of prism 20, and roll the finger to the opposite or second edge. In the example illustrated sequentially in FIG. 6, finger 36 is rolled in a clockwise direction to the right from left edge L, through center portion C, to right edge R. Portions L, C, and R of finger 36 are also illustrated in contact with prism surface 34 in FIGS. 2A-2C, respectively. Since the surface of finger 36 to be fingerprinted is curved, the area of contact between the finger and surface 34, and therefore the fingerprint image of the portion of the finger in contact with the surface, will move with respect to prism 20 in the direction the finger is rotated. As finger 36 is rolled across prism 20 in the clockwise manner shown in FIGS. 2A-2C, the fingerprint images of finger portions L, C, and R will move from left to right across image propagation surface 32. Optical images OIL, OIC and OIR, which are propagated from prism surface 32 as portions L, C, and R of finger 36 contact finger receiving surface 34, respectively, are illustrated in FIGS. 3A-3C.

Camera 22 is mounted with respect to prism 20 and configured in such a manner that its field of view encompasses the entire image propagation surface 32. Camera 22 continuously images fingerprint images such as OIL, OIC and OIR through its objective lens, and generates frames of video signals representative thereof. Commercially available video cameras using conventional rasters and scanning rates can be used.

Frame digitizer 24 is connected to camera 22, and digitizes the video signals representative of fingerprint images at any point in time (i.e., frames of signals representative of images such as OIL, OIC and OIR). Other imaging systems, such as optical imaging arrays capable of providing digital signals characteristic of fingerprint images can also be used.

Figure 4A:
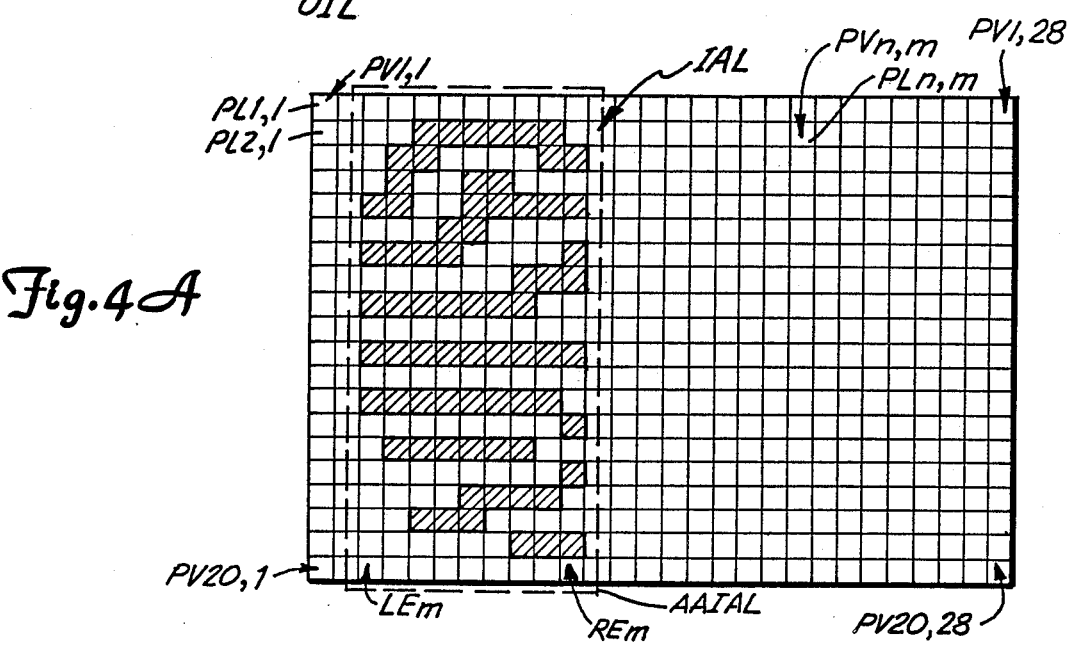
FIGS. 4A-4C are graphical representations of the optical images shown in FIGS. 3A-3C, respectively, after being digitized by the frame digitizer shown in FIG. 1.
Figure 4B:
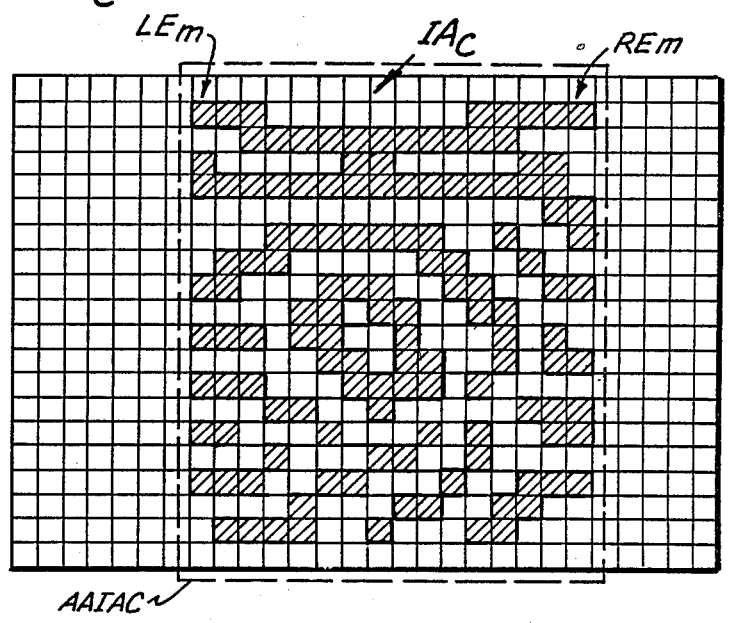
Figure 4C:
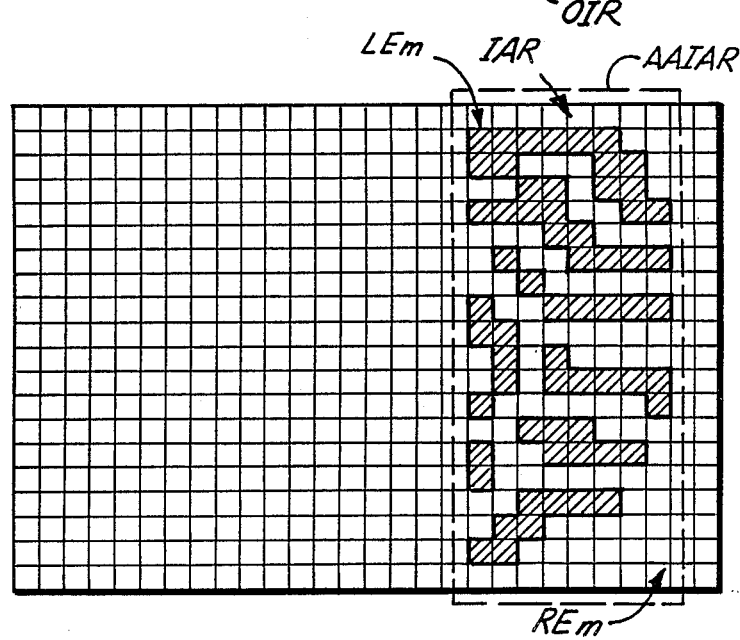

In the embodiment described herein, digitizer 24 is controlled by processor 12 and digitizes frames of video signals currently being generated by camera 22 when commanded by the processor. Digitizer 24 produces two-dimensional arrays of digital pixel values $PV_{n,m_f}$ representative of the intensity of fingerprint images at corresponding discrete pixel locations $PL_{n,m_f}$. Image arrays IAL, IAC and IAR of pixel values $PV_{n,m}$ corresponding to optical images OIL, OIC and OIR, respectively, are illustrated in FIGS. 4A-4C. Image arrays IAL, IAC and IAR are each formed by N horizontal rows and M vertical columns of pixel values $PV_{n,m_f}$. In one embodiment digitizer 24 causes the image arrays to be formed of N=480 rows by M=512 columns of pixel values. For purposes of example, image arrays such as IAL having 20 by 28 pixel values $PV_{n,m_f}$ are used throughout this description.

Pixel values $PV_{n,m_f}$ are digital values representative of the intensity of optical fingerprint images such as OIL, OIC and OIR at corresponding pixel locations $PL_{n,m_f}$ of image arrays IAL, IAC and IAR, respectively. In one embodiment, frame digitizer 24 includes an eight bit analog-to-digital converter which converts the video signals to eight bit pixel values $PV_{n,m_f}$ characteristic of fingerprint image intensity. In this embodiment an eight bit pixel value $PV_{n,m_f}$ representative of a decimel zero (i.e. "00000000") is a minimum pixel value PVMIN and characterizes a lowest intensity or blackest pixel location $PL_{n,m}$. A pixel value representative of a decimel two hundred and fifty-five (i.e. "11111111") is a maximum pixel value PVMAX and represents a highest intensity or whitest pixel location $PL_{n,m}$. A pixel value $PV_{n,m_f}$ representative of a decimel one hundred and twenty-eight (i.e. "10000000") represents a pixel location $PL_{n,m}$ having an intensity halfway between the lowest and highest intensities (i.e. grey).

For purposes of example, pixel values $PV_{n,m_f}$ are represented as being either white or black in the drawing figures accompanying this description. When finger 36 is not positioned on prism 20, pixel values $PV_{n,m_f}$ characteristic of the resulting background image will all be in the range of either PVMAX or PVMIN. When finger 36 is positioned on prism 20, ridges of the fingerprint will contact the prism, and pixel values $PV_{n,m_f}$ will be in the range of the other of PVMAX and PVMIN. In the embodiment of system 10 used for purposes of example throughout this description, dark portions of optical images such as OIL characterize portions of finger 36 in contact with prism 20 (i.e. the ridges) and will be represented by pixel values $PV_{n,m_f}$ having magnitudes approaching PVMIN. The background and valleys of finger 36 in this embodiment are characterized by lighter portions of images such as OIL, and are represented by pixel values $PV_{n,m_f}$ having magnitudes approaching PVMAX.

Processor 12 determines the presence or absence of fingerprint features in the image array currently being processed (current image array) by computing variance values $VAR_{n,m}$ for each pixel value $PV_{n,m_f}$ along one or more predetermined rows of the image array. Variance values $VAR_{n,m}$ are computed with respect to P adjacent pixel values on both sides of the pixel value $PV_{n,m_f}$ for which the variance is being determined. In one embodiment variance values $VAR_{n,m}$ are computed with respect to P=8 pixel values on both sides of the pixel value $PV_{n,m_f}$ for which the variance value is being determined. Variance value calculations can be made in accordance with Equation 1 which is described in FIG. 7. In one embodiment these variance computations are made for pixel values $PV_{n,m_f}$ in one row approximately one-third of the way down from an upper row of the image array, such as row n=180 in an image array having 480 rows. Variance values $VAR_{n,m}$ are computed for a given row of pixel values $PV_{n,m_I}$ because this series of pixel values is parallel to the direction of motion of optical images such as OIL, OIC and OIR across prism surface 32 when finger 36 is rolled, and is likely to include fingerprint features if the finger was placed on prism 20.

Figures 7, 8:
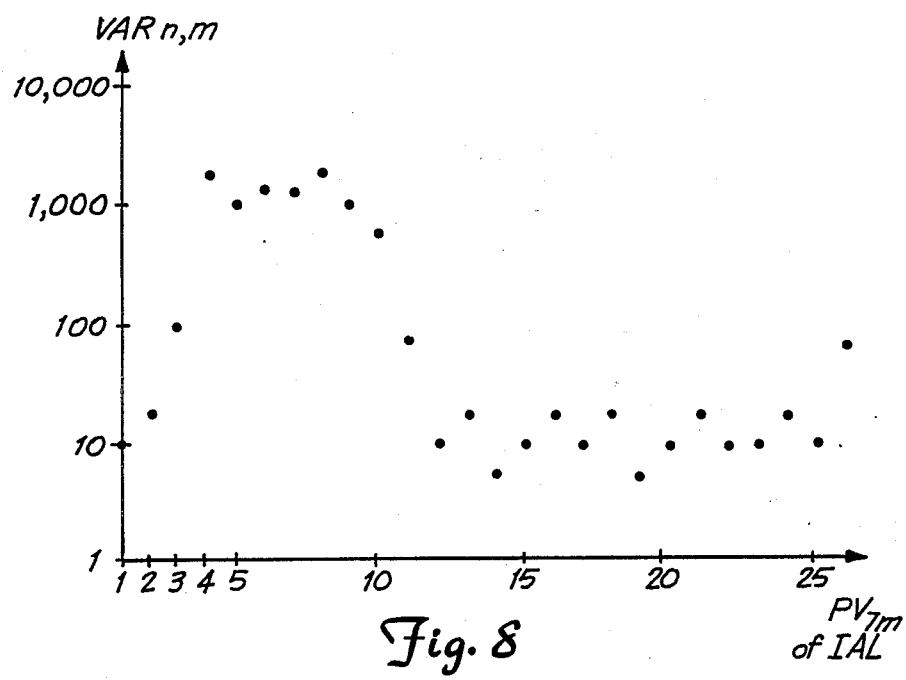
FIG. 7 shows an equation describing the calculation of variance values.
FIG. 8 is an illustration of the variance of pixel values across the seventh row of the image array shown in FIG. 4A.

A graphical representation of variance values $VAR_{n,m}$ computed for pixel values $PV_{n,m_I}$ in row n=7 of image array IAL (FIG. 4A) is shown in FIG. 8. As illustrated, those portions of image array IAL representative of left portion L of finger 36 (pixel values PV7,3 to PV7,11) have relatively high variance values $VAR_{n,m}$, in the range of eighty to several thousand. Portions of the image array IAL representative of background have relatively low variance values $VAR_{n,m}$ in the range of eight to thirty.

After variance values $VAR_{n,m}$ have been computed in the above-described manner, they are compared to a threshold variance value THR. Threshold variance THR is selected as a function of factors affecting the image such as the pressure with which finger 36 is positioned on prism 20, and the moistness of the finger. A threshold variance value THR of eighty to one hundred is used in one embodiment. Generally, all variance values $VAR_{n,m}$ computed for the given row will be less than threshold THR if finger 36 has not been positioned on prism 20. If the image array does include pixel values characteristic of fingerprint features, at least some variance values $VAR_{n,m}$ will be greater than theshold THR.

When it is desired to "capture" a rolled fingerprint image, the operator will actuate a foot pedal (not shown) or a key on terminal 18 to place system 10 in a capture mode. Assuming left edge portion L of finger 36 is positioned on prism 20 after the capture mode is entered, its optical image OIL will be propagated from the prism and data representative thereof will be stored in RAM 14 as image array IAL. While processing variance values $VAR_{n,m}$ for the selected row of image array IAL in the manner described above, processor 12 will recognize the fact that it includes fingerprint features since it includes variance values greater than or equal to threshold value THR. In the above example, this means processor 12 would find variance values $VAR_{n,m}$ for n equal to seven and at least some m from one to more greater than or equal to threshold THR. Image array IAL is thereby indicated as the first current image array to be processed after finger 36 was placed on prism 20.

Having identified a first image array IAL which includes pixel values $PV_{n,m_I}$ representative of fingerprint features, processor 12 next determines an active area AAIAL of image array IAL, or that portion of the array which includes pixel values $PV_{n,m_I}$ characteristic of fingerprint features in optical image OIL. In preferred embodiments, processor 12 makes this determination by assuming that the active area such as AAIAL is a rectangular array of pixel values $PV_{n,m_I}$ having an upper boundary at row n equal to one and a lower boundary at row n equal to N. Edges of the active area are determined as a function of variance values $VAR_{n,m}$ computed in accordance with Equation 1. In preferred embodiments, processor 12 identifies the left edge LEm by determining the closest column to the left edge of the image array such as IAL (i.e., PVn,1) which has a variance value $VAR_{n,m}$ greater than threshold value THR. By sequentially comparing VARn,1, VARn,2, etc. to threshold THR equal to one hundred, processor 12 identifies VAR7,3 as the left most variance value within image array IAL to exceed this threshold. Data characterizing the left edge LEm of active area AAIAL equal to three is then stored in RAM 14. Using a similar procedure, that is sequentially comparing variance values VAR7,28, VAR7,27, etc. to threshold THR, a right edge REm of active area AAIAL will be determined by processor 12 to equal to eleven, and stored in RAM 14 Active area AAIAL is illustrated graphically in FIG. 4A.

Figure 5A:
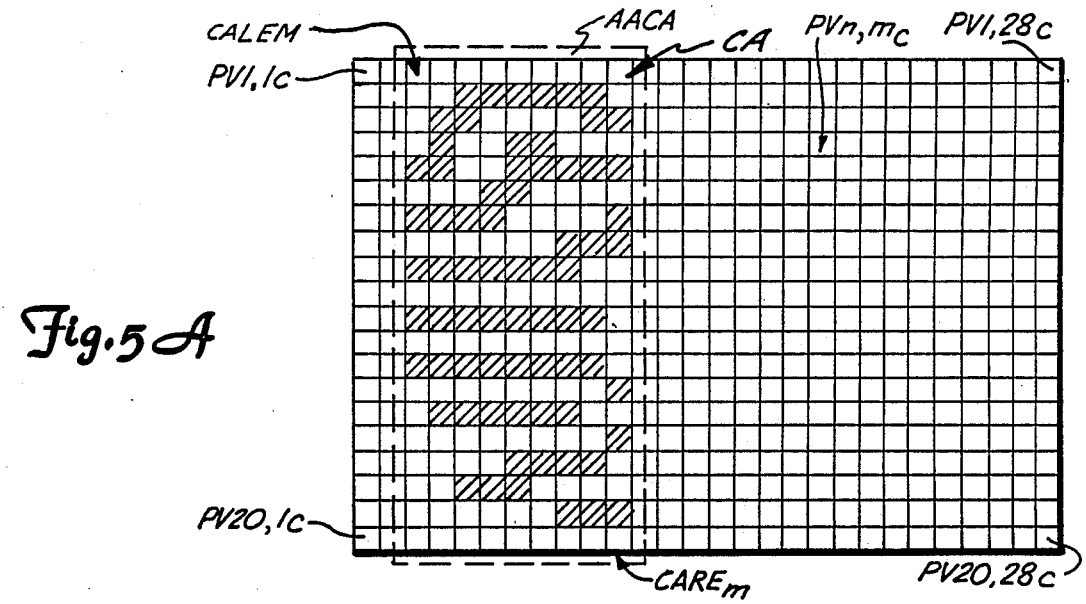
FIGS. 5A-5C are graphical representations of a composite array after the data representative of the fingerprint portions shown in FIGS. 4A-4C, respectively, are added to the composite array.

Having determined the boundaries of active area AAIAL of image array IAL (the first image array recognized as including data characteristic of fingerprint features), processor 12 causes all pixel values $PV_{n,m_I}$ of active area AAIAL to be copied into corresponding pixel locations of a composite array CA illustrated in FIG. 5A. In other words, pixel values $PV_{n,m_C}$ of composite array CA are set equal to corresponding pixel values $PV_{n,m_I}$ of active area AAIAL (i.e. for n from one to N and m from LEm through REm). Composite array CA is stored in RAM 14. All pixel values $PV_{n,m_C}$ of composite array CA will have been previously initialized to a predetermined value such as PVMAX. FIG. 5A graphically represents composite array CA after pixel values $PV_{n,m}$ of active area AAIAL have been copied into it. Data characterizing the active area AACA of composite array CA, the portion of the composite array to which data representative of fingerprint features have been copied, is also stored in RAM 14. Active area AACA is also assumed to extend from row n equal to one to row n equal to N, and bounded by left and right edges CALEm and CAREm, respectively. Following the copying of pixel values $PV_{n,m_I}$ from active area AAIAL into composite array CA, processor 12 will store data characterizing CALEm equal to three, and CAREm equal to eleven.

Following the copying of the first "slice" or active area such as AAIAL into composite array CA, processor 12 causes the next current frame of video signals provided by camera 22 to be digitized, and data representative thereof stored in RAM 14. Following the example used herein, finger 36 has rolled to the right during the above-described processing by such a distance that center portion C is now in contact with prism 20, as illustrated in FIG. 2B. Image array IAC (FIG. 4B) characteristic of optical image OIC (FIG. 3B) is therefore the "current" image array stored in RAM 14.

Having stored next current image array IAC, processor 12 will determine left and right edges LEm and REm, respectively, of an active area AAIAC of image array IAC by computing variance values $VAR_{n,m}$ along a predetermined row n of pixel values $PV_{n,m_I}$ as described above. Following this procedure on image array IAC, its active area AAIAC will be found to have a left edge LEm equal to eight, and a right edge REM equal to twenty-three Data representative of left edge LEm and right edge REm are stored in RAM 14.

Using the information characterizing the boundaries of active area AAIAC, processor 12 will determine the direction that finger 36 was rolled, and the extent to which active area AAIAC overlaps a current active area AACA of composite array CA. Continuing the example used above, processor 12 determines the direction of rotation by comparing left and right edges LEm and REm of active area AAIAC to the left and right edges CALEm and CAREm currently established for active area AACA of composite array CA. Left edge LEm equal to eight of active area AAIAC is found to be located between edges CALEm equal to three and CAREm equal to eleven of composite array CA, while right edge REm equal to twenty-three of active area AAIAC is beyond right edge CAREm equal to eleven of composite array CA. From this information processor 12 determines that finger 36 was rolled to the right, and data representative of this direction of motion is stored in RAM 14 for later reference. Right edge REm of active area AAIAL is therefore a "leading edge" of the active area, while left edge LEm is a "trailing edge".

The area of overlap of active area AAIAC with active area AACA of composite array CA is also determined to be pixel values $PVn,m_I$ between m equal to eight (i.e. LEm) and m equal to eleven (i.e. CAREm). Processor 12 can only generate a composite array such as CA representative of the rolled fingerprint image if the current active area or slice being processed includes data characteristic of fingerprint features adjacent features represented by data previously stored in the composite array. Assuming finger rotation to the right as in the above example, left edge LEm of active area AAIAC must be at least be adjacent to right edge CAREm of composite array CA to produce an accurate rolled fingerprint image. If both edges LEm and REm of active area AAIAC were to the left of CALEm, or to the right of CAREm there would be no overlap, indicating that two successive slices were discontinuous. A portion of the fingerprint is therefore lost. Processor 12 would then activate alarm 30, providing the operator with an indication that there was no overlap. The operator would then actuate terminal 18 to again place fingerprinting system 10 in its capture mode, and repeat the capture procedures described herein. In preferred embodiments, processor 12 requires a predetermined minimum amount of overlap such as eight pixel values $PVn,m_I$ between the active areas of the current image array and composite array. If this condition is not met, alarm 30 is activated and the operator is required to initiate the capture procedure again. In the example illustrated and used in this description, the four column overlap between active areas AAIAC and AACA is assumed to meet overlap requirements.

Although portions of active area AAIAC overlap active area AACA of composite array CA and may therefore provide redundant information, a smoother transition between two adjacent slices resulting in a composite array CA more accurately representative of the rolled fingerprint image can be obtained if pixel values $PVn,m_C$ in at least portions of current active area AACA of composite array CA which are overlapped by active area AAIAC are reprocessed and "recopied" as a function of corresponding pixel values $PVn,m_I$ in active area AAIAC. However, to save processing time and increase the speed by which composite array CA is generated, a predetermined portion of the overlapping area adjacent a trailing edge of the current image array active area (e.g. a portion adjacent left edge LEm of active area AAIAC) is ignored and not used while adding pixel values $PVn,m_I$ of the current active area such as AAIAC to composite array CA. In one embodiment, one-third of the overlapping pixel values adjacent a trailing edge of a current image array active area are not used.

Applying these procedures to the example used above, it is seen that active area AAIAC overlaps the current active area AACA of composite array CA by four columns, from column eight to column eleven. When rounded off to the nearest whole number, one-third of the four overlapping columns is one. Processor 12 will therefore not make use of pixel values $PVn,8_I$ from active area AAIAC when adding pixel values $PVn,m_I$ from active area AAIAC to composite array CA. In other words, if $PVn,m_C$ is the currently stored value in composite array CA, and $PVn,m_{C'}$ is the value after active area AAIAC is added thereto, pixel values $PVn,m_{C'}$ are set equal to corresponding values $PVn,m_C$ in composite array CA (i.e., no change is made).

Processor 12 will next merge or add pixel values $PVn,m_I$ from active area AAIAC into composite array CA one row at a time, beginning with row one and continuing through row N. The procedure implemented by processor 12 for each row is described as follows.

Beginning with pixel value $PVn,9_I$ (i.e., the first non-discounted pixel value closest to trailing edge LEm of active area AAIAC) and continuing with successive pixel values toward the leading edge of the active area, processor 12 compares pixel values $PVn,m_I$ of active area AAIAC to corresponding pixel values $PVn,m_C$ in composite array CA. So long as pixel values $PVn,m_I$ of active area AAIAC have a relative magnitude greater than (i.e. are lighter than) corresponding pixel values $PVn,m_C$ in composite array CA, the pixel value stored in the composite array is unaltered (i.e. $PVn,m_{C'}=PVn,m_C$ if $PVn,m_I$ is greater than $PVn,m_C$). This procedure is repeated for sequential pixel values $PVN,m_I$ and $PVn,m_C$ of the row in the direction of right edge REm of active area AAIAC until the comparison identifies a pixel value in active area AAIAC which is less than (i.e. darker than) its corresponding pixel value in composite array CA.

After a pixel value $PVn,m_I$ in active area AAIAC which has a magnitude less than its corresponding pixel value $PVn,m_C$ in composite array CA is identified, a predetermined number of sequential pixel values $PVn,m_I$ in the direction of leading edge REm are averaged with their corresponding pixel values $PVn,m_C$ in composite array CA. The averaged pixel values are then stored at the corresponding location in composite array CA. In other words $PVn,m_{C'}=(PVn,m_C+PVn,m_I)/2$. In one preferred embodiment, eight corresponding and adjacent pixel values $PVn,m_C$ and $PVn,m_I$ are averaged and stored in the above manner, including the pixel value $PVn,m_I$ which has a value less than its corresponding pixel value $PVn,m_C$.

After the predetermined number of corresponding pixel values $PVn,m_I$ and $PVn,m_C$ are averaged and stored, remaining pixel values $PVn,m_I$ in the row of active area AAIAC in the direction of the leading edge (i.e. $PVn,m_I$ up to REm) are copied into corresponding locations in composite array CA (i.e. $PVn,m_{C'}=PVn,m_I$).

Figure 5B:
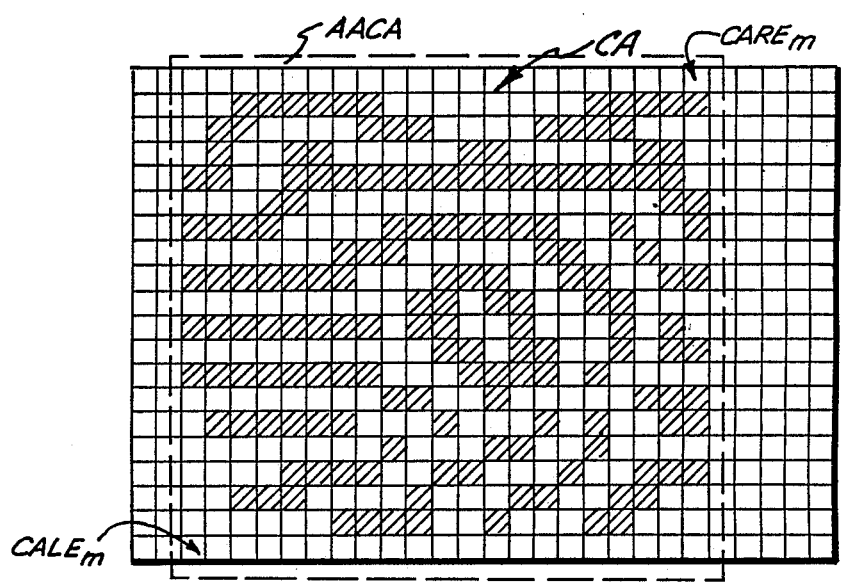
Figure 5C:
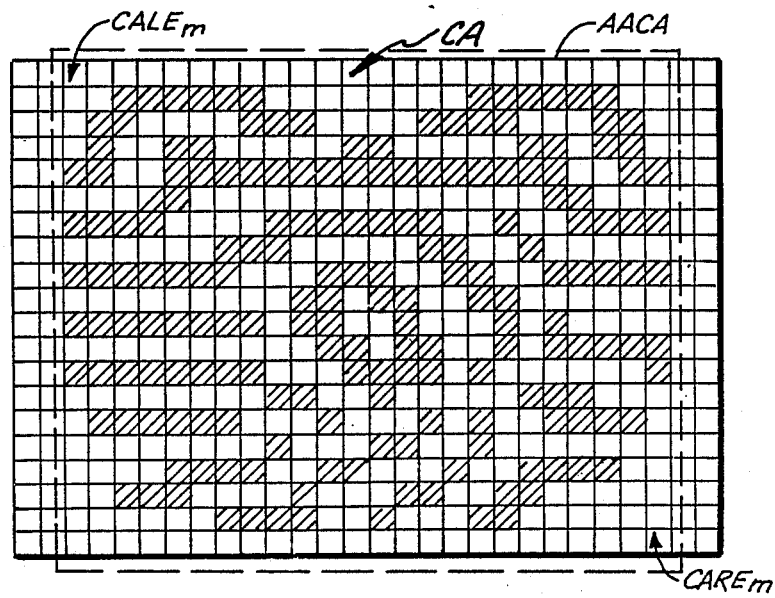

The procedure described above is repeated, merging the remaining rows of pixel values $PVn,m_I$ of active area AAIAC into composite array AACA. Composite array CA will then include pixel values $PVn,m_C$ characteristic of a portion of the fingerprint image shown in FIG. 5B. Data characterizing the borders of the "current" active area AACA of composite array CA illustrated in FIG. 5B, that is CALEm, equal to three and CAREm equal to twenty-eight, is then stored in RAM 14.

Processor 12 will then again cause a current image being propoagated from prism 20 to be digitized and stored in RAM 14. Following the example used above, finger 36 will have rolled to the right to the extent shown in FIG. 2C, with right portion R of the finger being in contact with prism 20. Optical image OIR propagated from prism 20 is illustrated in FIG. 3C. Image array IAR characteristic of optical image OIR is illustrated in FIG. 4C. The procedures described above are then repeated, merging active area AAIAR of image array IAR into composite array CA. Processor 12 will also compare the direction that active area AAIAR has moved with respect to the direction of previous active areas such as AAIAC. If the direction has changed during a capture operation, alarm 30 will be activated to indicate that the procedure must be repeated.

Eventually, the above steps will be repeated for an active area in which all variance values $VAR_{n,m}$ are less that THR. Processor 12 recognizes this occurance as an indication that finger 36 was removed from prism 20. Fingerprint image capture is then complete. Composite array CA will include pixel values $PV_{n,m_C}$ representative of a rolled fingerprint taken from finger 36. Before being displayed on video monitor 26 or onto an applicant card by printer 28, pixel values $PV_{n,m_C}$ can also be processed in accordance with the methods described in the above referenced copending application Ser. No. 020,331.

Although the present invention has been described with reference to the preferred embodiments, those skilled in the art will recognize that changes may be made in form and detail without departing from the spirit and scope of the invention.

In particular, although three image arrays are illustrated as being merged together to form the composite array in the example used above, longer numbers of image arrays can also be used. In one embodiment the invention is capable of merging six to twelve image arrays of pixel values into the composite array during a finger roll of one to two second. A source code listing of a program run on a Motorola 68000 microprocessor and implementing the above described procedure follows.

What is claimed is:

1. A method for generating data characteristic of a rolled fingerprint image, including:
   providing an optical device having a finger receiving surface;
   rolling a finger across the finger receiving surface of the optical device and propagating fingerprint images of finger portions in contact with the surface from the device;
   imaging the finger receiving surface of the optical device and generating digital data representative of fingerprint images propagated therefrom;
   storing arrays of digital data characteristic of adjacent and overlapping fingerprint images of portions of the finger as the finger is rolled across the finger receiving surface of the optical device; and
   generating a composite array of digital data characteristic of a rolled fingerprint image as a mathematical function of overlapping image data from a plurality of arrays and characteristic of the overlapping portions of the fingerprint images.

2. The method of claim 1 wherein generating the composite array includes generating the composite array of digital data characteristic of an average of the overlapping image data.

3. The method of claim 1 wherein generating the composite array includes generating the composite array of digital data characteristic of the rolled fingerprint image as a mathematical function of a comparison of the overlapping image data.

4. The method of claim 1 wherein generating the composite array includes generating the composite array of digital data characteristic of the rolled fingerprint image as a mathematical function of a comparison and an average of the overlapping image data.

5. The method of claim 4 wherein generating the composite array of digital data includes:
   storing a first array of data characteristic of a fingerprint image of a first finger portion;
   merging the first array of data into the composite array;
   storing a second array of a data characteristic of a fingerprint image of a second finger portion which at least partially overlaps the fingerprint image characterized by the composite array;
   identifying overlapping data in the composite and second arrays which is characteristic of overlapping portions of the fingerprint images; and
   merging the second array of data into the composite array, including storing data in the composite array characteristic of the overlapping portions of the fingerprint images as a mathematical function of a comparison and an average of the overlapping image data in the second and composite arrays.

6. The method of claim 5 and further including:
   storing a third array of data characteristic of a fingerprint image of a third finger portion which at least partially overlaps the fingerprint image characterized by the composite array;
   identifying overlapping data in the composite and third arrays which is characteristic of overlapping portions of the fingerprint images; and
   merging the third array of data into the composite array, including storing data in the composite array characteristic of the overlapping portions of the fingerprint images as a mathematical function of a comparison and an average of the overlapping image data in the composite and third arrays.

7. The method of claim 6 and repeating the steps of storing, identifying and merging data for fourth and subsequent arrays of data while the finger is being rolled.

8. The method of claim 6 and performing the steps of storing, identifying and merging data in real time as the finger is rolled.

9. The method of claim 5 wherein the arrays of digital data include arrays of pixel values characteristic of fingerprint image intensity at discrete pixel locations, and merging the second array of data into the composite array includes:
   sequentially comparing pixel values in a row of the second array and representative of adjacent image portions in a direction the finger is rolled to pixel values in the composite array corresponding to the same overlapping portion of the fingerprint image;
   retaining the pixel values in the composite array if the magnitude of the pixel values in the second array are greater than the corresponding pixel values in the composite array;
   identifying a pixel value in the row of the second array that is less than the corresponding pixel value in the composite array;
   averaging adjacent pixel values in a predetermined portion of the row of the second array adjacent the identified pixel value with the corresponding pixel values in the composite array;

storing the averaged pixel values in the composite array; and storing the pixel values of the second array in the composite array for a remaining portion of the row of pixel values in the second array following the predetermined portion.

10. The method of claim 9 and repeating the steps of comparing, retaining, identifying, averaging and storing pixel values of all rows of pixel values in the second array.

11. The method of claim 10 wherein generating the composite array further includes ignoring pixel values in the second array adjacent a trailing edge of the overlapping portions of the fingerprint images.

12. The method of claim 1 and further including:
determining the amount of overlap characterized by the arrays; and
activating an alarm if the amount of overlap is less than a predetermined amount.

13. The method of claim 1 and including:
identifying left and right active area boundaries of the arrays of digital data defining active areas substantially including only data characteristic of fingerprint images; and
generating the composite array only as a mathematical function of data within the active areas of the arrays.

14. The method of claim 13 wherein identifying the left and right active area boundaries includes:
computing variance values of digital values of the array along an axis parallel to the direction that the finger is rolled;
comparing the variance values to a threshold variance value characteristic of fingerprint images; and
identifying the left and right active area boundaries as a mathematical function of the comparison.

15. The method of claim 13 and further including:
determining the direction of motion of the finger as it is being rolled as a mathematical function of active area boundaries of arrays of fingerprint images of adjacent portions of the finger; and
activating an alarm if the direction of motion changes as the finger is rolled.

16. A method for generating data characteristic of a rolled fingerprint image, including:
generating arrays of slice data characteristic of adjacent and overlapping two-dimensional slices of the fingerprint image; and
generating a composite array of data characteristic of the rolled fingerprint image as a mathematical function of overlapping slice data from a plurality of overlapping slices.

17. The method of claim 16 wherein generating the composite array includes generating the composite array as a mathematical function of a comparison of the overlapping data characteristic of overlapping portions of adjacent slices.

18. The method of claim 16 wherein generating the composite array includes generating the composite array as a mathematical function of an average of the overlapping slice data characteristic of overlapping portions of adjacent slices.

19. The method of claim 16 wherein generating the composite array includes generating the composite array as a mathematical function of an average and a comparison of the overlapping slice data characteristic of overlapping portions of adjacent slices.

20. The method of claim 16 wherein the steps are performed in real time.

21. The method of claim 19 wherein:
generating arrays of slice data includes:
generating a first array of slice data characteristic of a first slice of the fingerprint image; and
generating a second array of slice data characteristic of a second slice of the fingerprint image which is adjacent to and overlaps the first slice; and
generating the composite array includes:
merging the first array of slice data into the composite array;
identifying overlapping data in the composite and second arrays which is characteristic of overlapping portions of the slices of fingerprint image; and
merging the second array of slice data into the composite array, including storing slice data in the composite array characteristic of the overlapping portions of the fingerprint images as a function of a comparison and an average of the overlapping image data in the second and composite arrays.

22. The method of claim 21 wherein:
generating arrays of slice data further includes storing a third array of slice data characteristic of a third slice of the fingerprint image which is adjacent to and overlaps the second slice; and
generating the composite array further includes:
identifying overlapping data in the composite and third arrays which is characteristic of overlapping portions of the fingerprint images; and
merging the third array of slice data into the composite array includes storing slice data in the composite array characteristic of the overlapping portions of the fingerprint images as a mathematical function of a comparison and an average of the overlapping slice data in the composite and third arrays.

23. The method of claim 22 and repeating the steps of storing, identifying and merging data for fourth and subsequent arrays of slice data.

24. The method of claim 21 wherein the arrays of data include arrays of pixel values characteristic of fingerprint image intensity at discrete pixel locations, and merging the second array of slice data into the composite array includes:
comparing pixel values in a row of the second array and representative of adjacent image portions to pixel values in the composite array corresponding to the same overlapping portion of a fingerprint image;
retaining the pixel values in the composite array if the magnitude of the pixel values in the second array are greater than the corresponding pixel values in the composite array;
identifying the pixel value in the row of the second array that is less than the corresponding pixel value in the composite array;
averaging adjacent pixel values in a predetermined portion of the row of the second array adjacent the identified pixel value with the corresponding pixel values in the composite array;
storing the averaged pixel values in the composite array; and storing the pixel values of the second array in the composite array for the remaining portion of the row of pixel values in the second array following the predetermined portion.

25. The method of claim 24 and repeating the steps of comparing, retaining, identifying, averaging and storing pixel values for all rows of pixel values in the second array.

26. A method for operating a programmable processor to generate data characteristic of a rolled fingerprint image, including:
providing an optical device having a finger receiving surface;
rolling a finger across the finger receiving surface of the optical device and propagating fingerprint images of finger portions in contact with the surface from the device;
imaging the finger receiving surface of the optical device and generating digital data representative of fingerprint images propagated therefrom;
storing arrays of digital data characteristic of the images propagated from the optical device;
identifying active portions of the arrays which are representative of fingerprint features as a mathematical function of the stored digital data; and
generating a composite array of data characteristic of the rolled fingerprint image as a mathematical function of the data representative of the identified active portions of the stored arrays.

27. The method of claim 26 wherein identifying the active portions of the stored arrays includes identifying leading and trailing active area boundaries of the arrays about an axis parallel to the direction that the finger is rolled.

28. The method of claim 27 wherein identifying leading and trailing active area boundaries includes:
computing variance values of digital values of the array along an axis parallel to the direction that the finger is rolled;
comparing the variance values to a threshold variance value characteristic of fingerprint images; and
identifying the leading and trailing active area boundaries as a mathematical function of the comparison.

29. The method of claim 27 and further including:
determining the direction of motion of the finger as it is being rolled as a mathematical function of the active area or boundaries of arrays of fingerprint images of adjacent portions of the finger; and
activating an alarm if the direction of motion changes as the finger is rolled.

30. The method of claim 27 and further including:
determining the amount of overlapping image portions characterized by arrays representative of overlapping and adjacent fingerprint images as a mathematical function of the leading and trailing active area boundaries of the arrays; and
activating an alarm if the amount of overlap is less than a predetermined amount.

31. The method of claim 26 wherein:
storing arrays of digital data includes storing arrays of data characteristic of adjacent and overlapping fingerprint images of portions of the finger as the finger is rolled across the finger receiving surface of the optical device; and
generating the composite array includes generating the composite array of digital data characteristic of a rolled fingerprint image as a mathematical function of overlapping image data from a plurality of arrays and characteristic of overlapping portions of the fingerprint images.

32. A method for generating data characteristic of a rolled fingerprint image in real time, including:
(a) providing an optical device having a finger receiving surface;
(b) continuously rolling a finger across the finger receiving surface of the optical device and propagating fingerprint images of finger portions in contact with the surface from the device;
(c) imaging the finger receiving surface of the optical device and generating digital data representative of fingerprint images propagated therefrom;
(d) storing a first array of data characteristic of a fingerprint image of a first finger portion;
(e) identifying leading and trailing active area boundaries of the first array which define areas substantially including only data characteristic of a fingerprint image;
(f) merging the first array of data into a composite array;
(g) storing a second array of data characteristic of a second finger portion, after the first array is merged into the composite array;
(h) identifying leading and trailing active area boundaries of the second array which define areas substantially including only data characteristic of a fingerprint image;
(i) determining the amount of fingerprint image overlap characterized by the second and composite arrays as a mathematical function of the active area boundaries;
(j) determining the direction of motion of the finger as a mathematical function of the active area boundaries;
(k) activating an alarm if the fingerprint image overlap is less than a predetermined amount or the direction of motion changes;
(l) merging the second array into the composite array, including storing data in the composite array as a mathematical function of the data in the composite array and second array which are characteristic of overlapping image portions of the fingerprint images, if the direction of motion has not changed and the amount of overlap is not less than the predetermined overlap; and
(m) repeating steps (g)–(l) for third and subsequent arrays until the composite array characterizes the rolled fingerprint image.

33. The method of claim 32 wherein merging arrays into the composite array includes storing data in the composite array as a mathematical function of an average and comparison of the overlapping image data.

* * * * *

UNITED STATES PATENT AND TRADEMARK OFFICE
CERTIFICATE OF CORRECTION

PATENT NO. : 4,933,976

DATED : June 12, 1990

INVENTOR(S) : Brian H. Fishbine et al.

It is certified that error appears in the above-identified patent and that said Letters Patent is hereby corrected as shown below:

Col. 9, line 65, after "characteristic", insert --of the rolled fingerprint image as a mathematical function--

Signed and Sealed this

Twenty-sixth Day of November, 1991

*Attest:*

HARRY F. MANBECK, JR.

*Attesting Officer*      *Commissioner of Patents and Trademarks*